(12) United States Patent
Jeon et al.

(10) Patent No.: US 12,522,037 B2
(45) Date of Patent: Jan. 13, 2026

(54) SUSPENSION APPARATUS

(71) Applicant: HYUNDAI MOBIS CO., LTD., Seoul (KR)

(72) Inventors: Jae Woong Jeon, Yongin-si (KR); Jin Wook Joo, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/930,111

(22) Filed: Oct. 29, 2024

(65) Prior Publication Data

US 2025/0262898 A1 Aug. 21, 2025

(30) Foreign Application Priority Data

Feb. 21, 2024 (KR) .......... 10-2024-0025358

(51) Int. Cl.
*B60G 3/26* (2006.01)

(52) U.S. Cl.
CPC ............ *B60G 3/26* (2013.01); *B60G 2200/18* (2013.01); *B60G 2200/422* (2013.01); *B60G 2204/45* (2013.01)

(58) Field of Classification Search
CPC .. B60G 2204/45; B60G 3/26; B60G 2200/18; B60G 2200/422; B60K 7/00
See application file for complete search history.

(56) References Cited

U.S. PATENT DOCUMENTS

2022/0379676 A1\* 12/2022 Joo .......... B60G 7/008

FOREIGN PATENT DOCUMENTS

GB 2598578 A \* 3/2022 ............ B60G 7/02
KR 10-2019-0041855 A 4/2019

\* cited by examiner

*Primary Examiner* — Jason D Shanske
*Assistant Examiner* — Matthew James O'Neill
(74) *Attorney, Agent, or Firm* — NSIP Law

(57) ABSTRACT

A suspension apparatus and a suspension apparatus for a vehicle are provided. The suspension apparatus includes a drive unit installed inside a wheel, a first knuckle connected to the drive unit and configured to rotate around a first axis, a second knuckle connected to the first knuckle and configured to move along a second axis spaced apart from the first axis, a first suspension arm connected to the second knuckle and configured to support the second knuckle with respect to a vehicle body, and a limiting member connected to the first suspension arm and configured to limit rotation of the second knuckle around the second axis.

18 Claims, 14 Drawing Sheets

SUSPENSION APPARATUS

CROSS-REFERENCE TO RELATED APPLICATION(S)

This application claims priority from and the benefit under 35 USC § 119 of Korean Patent Application No. 10-2024-0025358 filed on Feb. 21, 2024, in the Korean Intellectual Property Office, the entire disclosure of which is hereby incorporated by reference for all purposes.

BACKGROUND

1. FIELD

Exemplary embodiments of the present disclosure relate to a suspension apparatus, and more particularly, to a vehicle suspension apparatus in which a steering axis and a suspension axis are separated from each other.

2. DESCRIPTION OF THE RELATED ART

In general, around the world, cars are changing from being a means of transportation to an extension of living space, and thus, purpose-built vehicles (PBVs) with an ample interior space are spotlighted. Such purpose-based vehicles have an expanded interior space by applying in-wheel motors that directly drive wheels by placing a drive motor inside each wheel, unlike a typical electric vehicle having a drive motor that is located in the place of an existing internal combustion engine.

However, when a space inside the wheel becomes narrower than before due to the in-wheel motor and a driving force and a braking force are applied to the wheel due to an increase in a kingpin offset, there is a problem in that a torque steer phenomenon occurs in which the wheel is arbitrarily steered.

The background art of the present disclosure is disclosed in Korean Patent Application Laid-Open No. 10-2019-0041855 (published on Apr. 23, 2019 and entitled "Steering System for In-Wheel Motor Vehicle").

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

Various embodiments are directed to providing a suspension apparatus that can improve the driving stability of a vehicle.

In a general aspect of the disclosure, a suspension apparatus includes: a drive unit installed inside a wheel; a first knuckle connected to the drive unit and configured to rotate around a first axis; a second knuckle connected to the first knuckle and configured to move along a second axis spaced apart from the first axis; a first suspension arm connected to the second knuckle and configured to support the second knuckle with respect to a vehicle body; and a limiting member connected to the first suspension arm and configured to limit rotation of the second knuckle around the second axis.

A distance between the second axis and the wheel may be greater than a distance between the first axis and the wheel.

The drive unit, the first knuckle, and the second knuckle may be sequentially disposed from the wheel toward the vehicle body.

The first suspension arm may include: a first arm body configured to extend from the vehicle body toward the second knuckle; a joint body connected to the second knuckle and comprising a first end and a second end; and a first joint connected to the first end and configured to rotatably support the first arm body.

The first end of the joint body may protrudes at one side of the second knuckle, wherein the second end of the joint body may protrude at another side of the second knuckle.

The first end and the second end may be spaced apart from each other in a direction intersecting the second axis.

The second axis may be inclined with respect to a third axis extending vertically from a ground and a longitudinal direction of the vehicle body, wherein the first joint may have a spherical shape.

Both sides of the limiting member may be respectively connected to the vehicle body and the second end.

The limiting member may include: a limiting link spaced apart from the first arm body and configured to extend from the vehicle body toward the second knuckle; and a limiting joint connected to the second end and configured to rotatably support the limiting link with respect to the second end.

The limiting joint may include: an outer body connected to the limiting link; an inner body disposed inside the outer body and connected to the second end; and a stud connected to the inner body and configured to rotatably contact with the outer body.

The second axis may be inclined with respect to a third axis extending vertically from a ground and a longitudinal direction of the vehicle body, wherein the stud may have a spherical shape.

The limiting joint may further include a stopper disposed to surround the inner body and configured to restrict the stud from rotating about a direction parallel to the second axis.

A width of the stopper parallel to the second axis may be greater than a width of the stopper intersecting the second axis.

The suspension apparatus may further include a second suspension arm spaced apart from the first suspension arm and connected to the second knuckle.

The second knuckle may include a first connection part and a second connection part spaced apart from each other along the second axis, wherein the first suspension arm and the second suspension arm may be respectively connected to the first connection part and the second connection part.

In another general aspect of the disclosure, a suspension apparatus for a vehicle includes: a drive unit installed inside a wheel and configured to provide a driving force to rotate the wheel; a brake unit configured to provide a braking force to the wheel; a first knuckle connected to the drive unit and configured to rotate around a first axis; a second knuckle connected to the first knuckle and configured to move along a second axis spaced apart from the first axis; a first suspension arm connected to the second knuckle and configured to support the second knuckle with respect to a vehicle body; and a limiting member connected to the first suspension arm and configured to limit rotation of the second knuckle around the second axis.

The drive unit may include a motor.

The first knuckle, the second knuckle, the first suspension arm and the limiting member may be configured to counter an increase in torque steer due to an increase in a kingpin offset, in response to at least one of the driving force being applied by the drive unit, the braking force being applied by the brake unit, or a combination thereof.

A distance between the second axis and the wheel may be greater than a distance between the first axis and the wheel, wherein the drive unit, the first knuckle, and the second knuckle may be sequentially disposed from the wheel toward the vehicle body.

The first suspension arm may include: a first arm body configured to extend from the vehicle body toward the second knuckle; a joint body connected to the second knuckle and comprising a first end and a second end; and a first joint connected to the first end and configured to rotatably support the first arm body.

DETAILED DESCRIPTION

Figure 1:
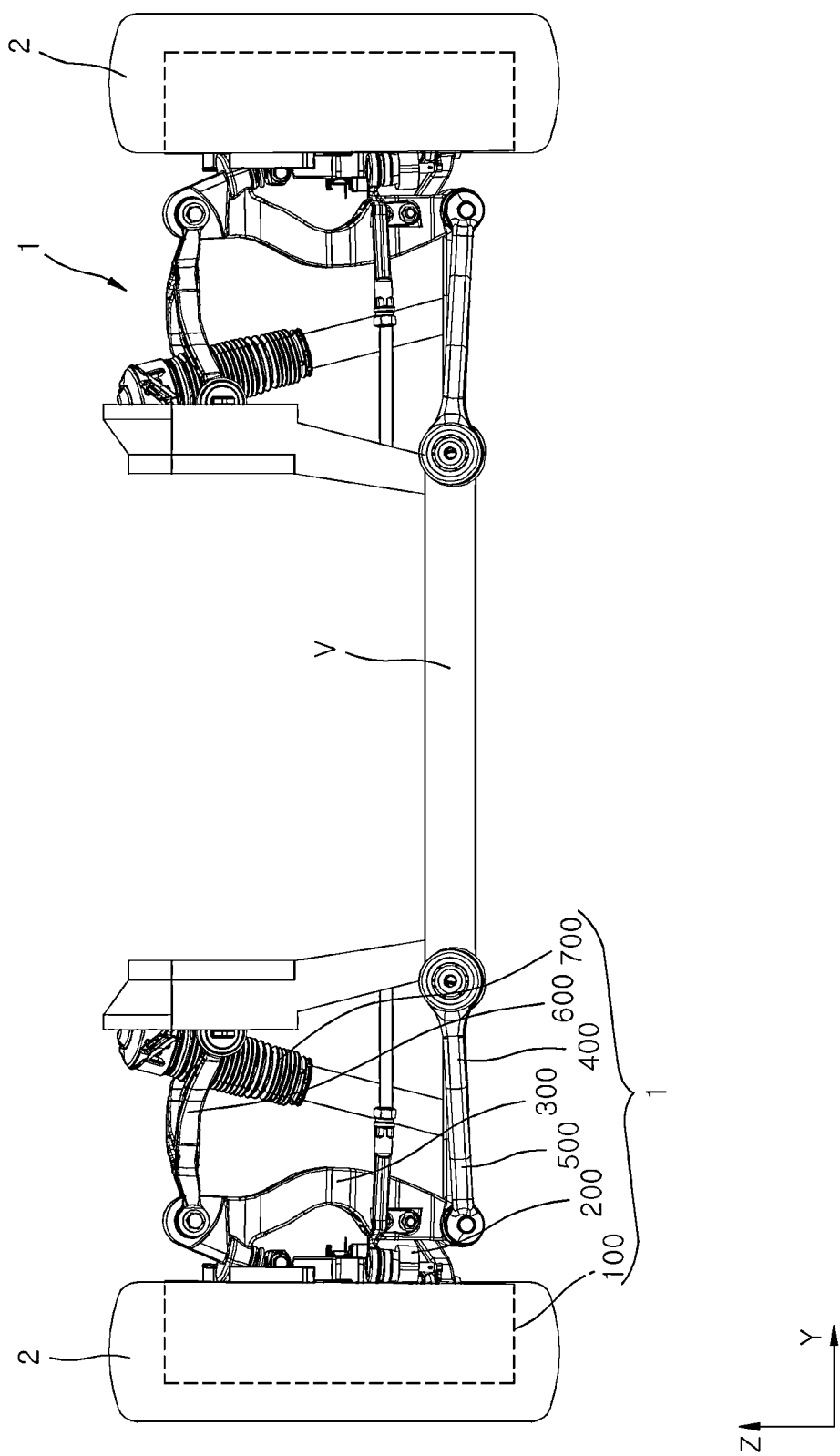
FIG. 1 is a view schematically illustrating an installation state of a suspension apparatus in accordance with an embodiment of the present disclosure.

Hereinafter, an embodiment of the present disclosure is described with reference to the accompanying drawings.

In this process, the thicknesses of lines or the sizes of elements illustrated in the drawings may be exaggerated for the purpose of clarity and convenience of explanation. Furthermore, terms to be described below are terms defined in consideration of functions thereof in the present disclosure and may be changed according to the intention of a user or an operator, or practice. Accordingly, such terms should be defined based on the disclosure over the present specification.

Furthermore, in the present specification, when a certain part is referred to as being "connected (or coupled) to" another part, it may indicate that the former part is directly connected (or coupled) to the latter part or indirectly connected (or coupled) to the latter part with another part interposed therebetween. In the present specification, when a certain part "includes (or comprises)" a certain component, it means that the part does not exclude another component but may further "include (or comprise)" another component, unless referred to the contrary.

Furthermore, the same reference numerals may refer to the same components throughout the present specification. Even though the same reference numerals or similar reference numerals are not mentioned or described in a specific drawing, the reference numerals may be described based on other drawings. Furthermore, even though there is a portion which is not indicated by reference numerals in a specific drawing, the portion may be described based on other drawings. Furthermore, the number, shapes, and sizes of detailed components included in the drawings of the present application and relative differences in the sizes are set for convenience of understanding, and do not limit embodiments and may be implemented in various forms.

Figure 2:
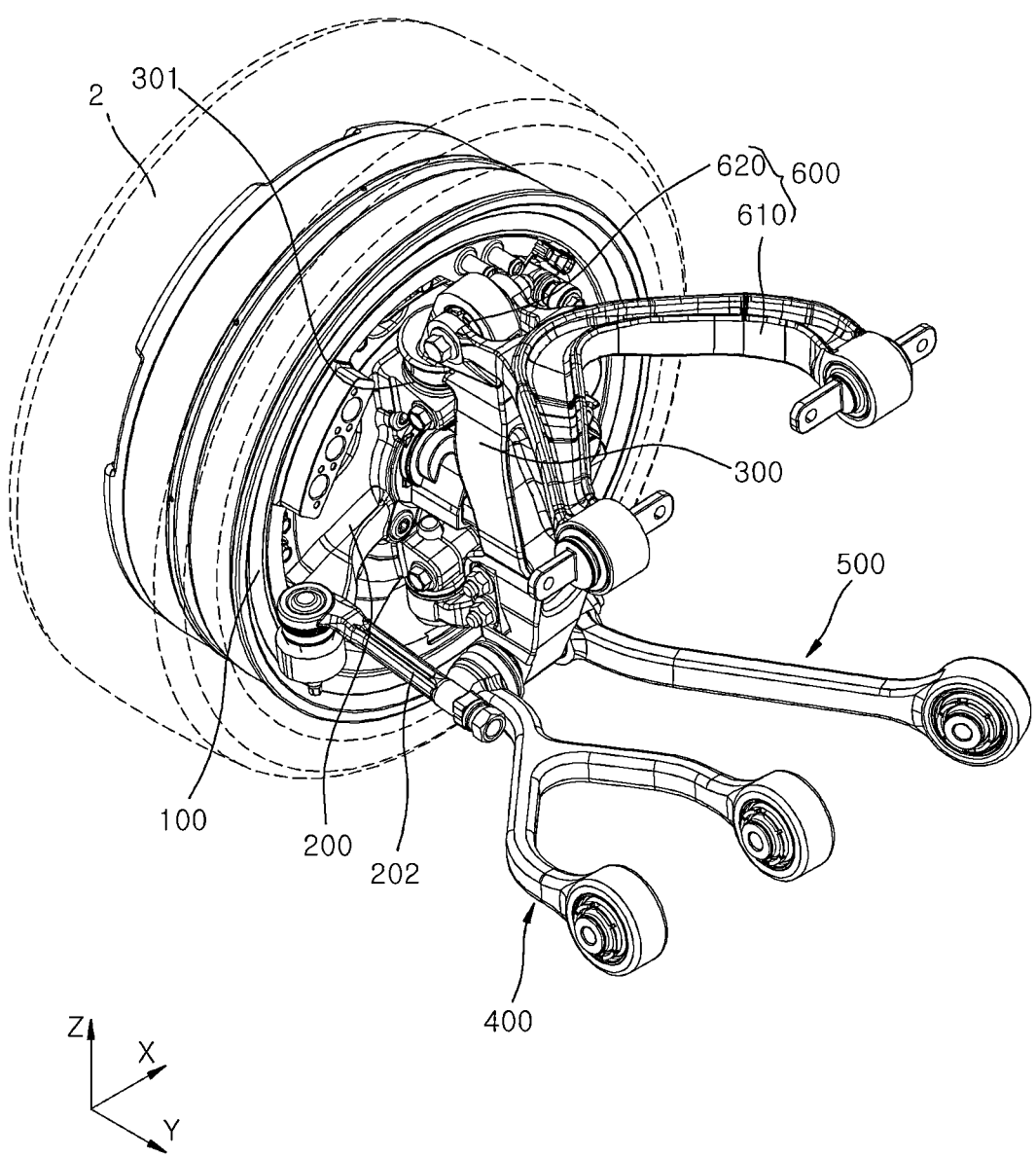
FIG. 2 is a perspective view schematically illustrating the configuration of the suspension apparatus in accordance with an embodiment of the present disclosure.
Figure 3:
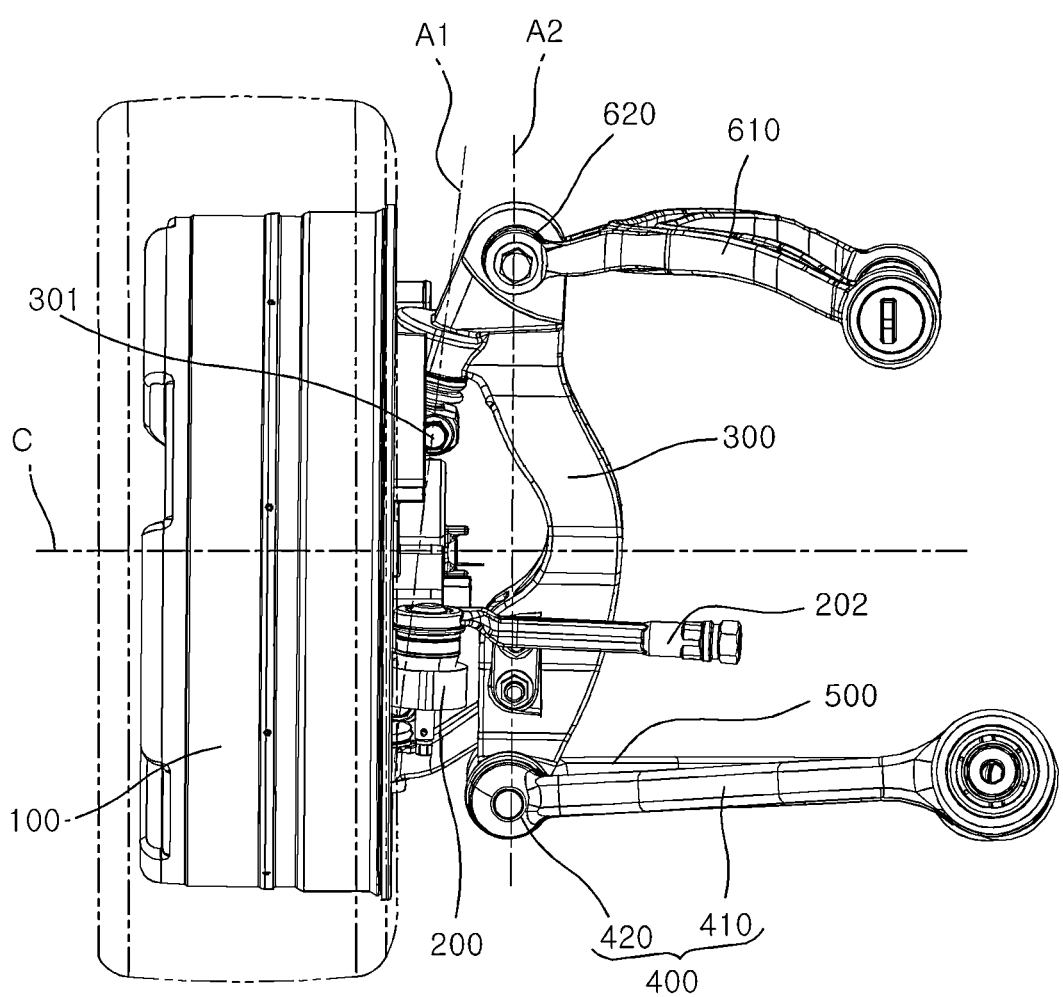
FIG. 3 is a side view schematically illustrating the configuration of the suspension apparatus in accordance with an embodiment of the present disclosure.
Figure 4:
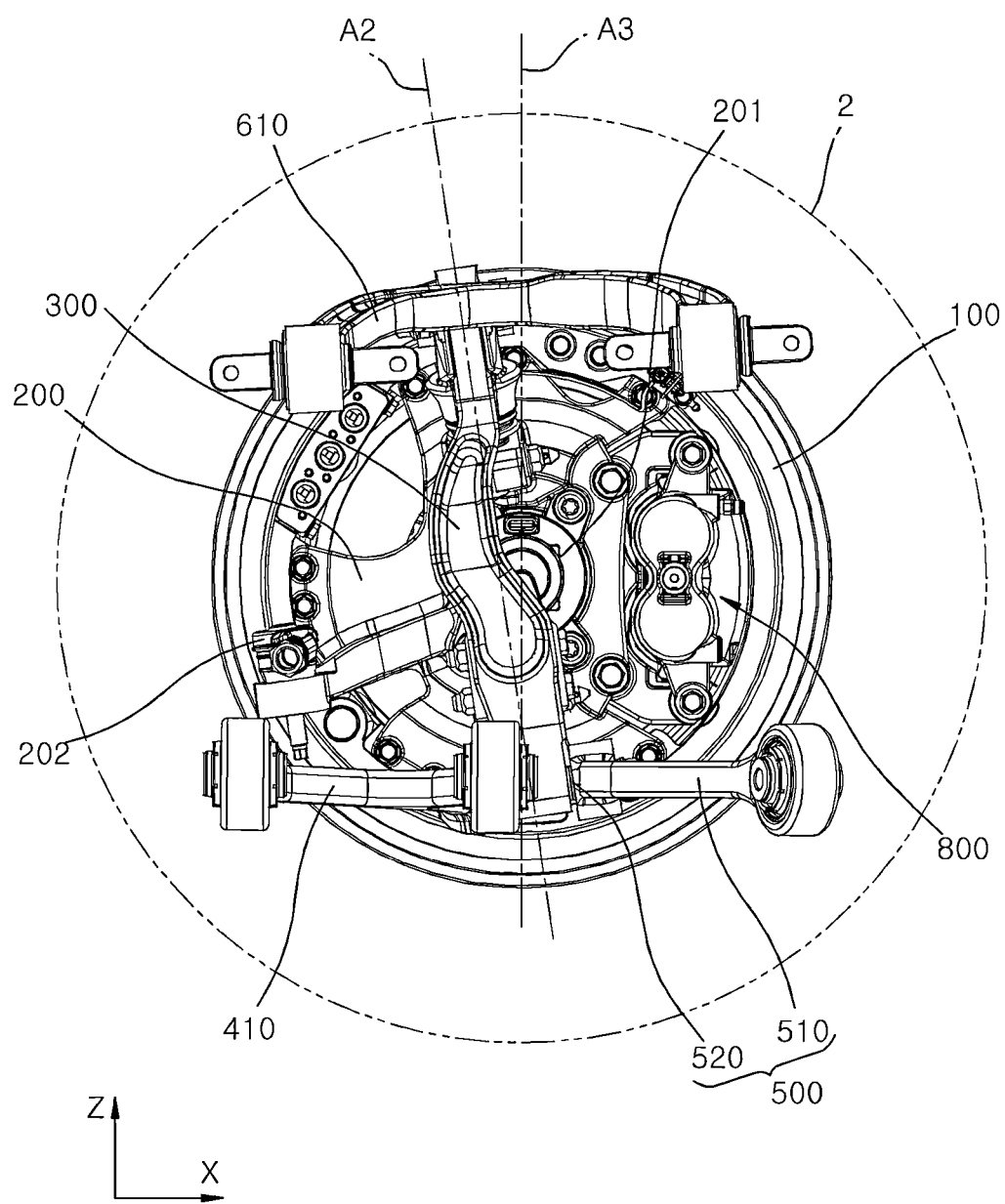
FIG. 4 is a front view schematically illustrating the configuration of the suspension apparatus in accordance with an embodiment of the present disclosure.
Figure 5:
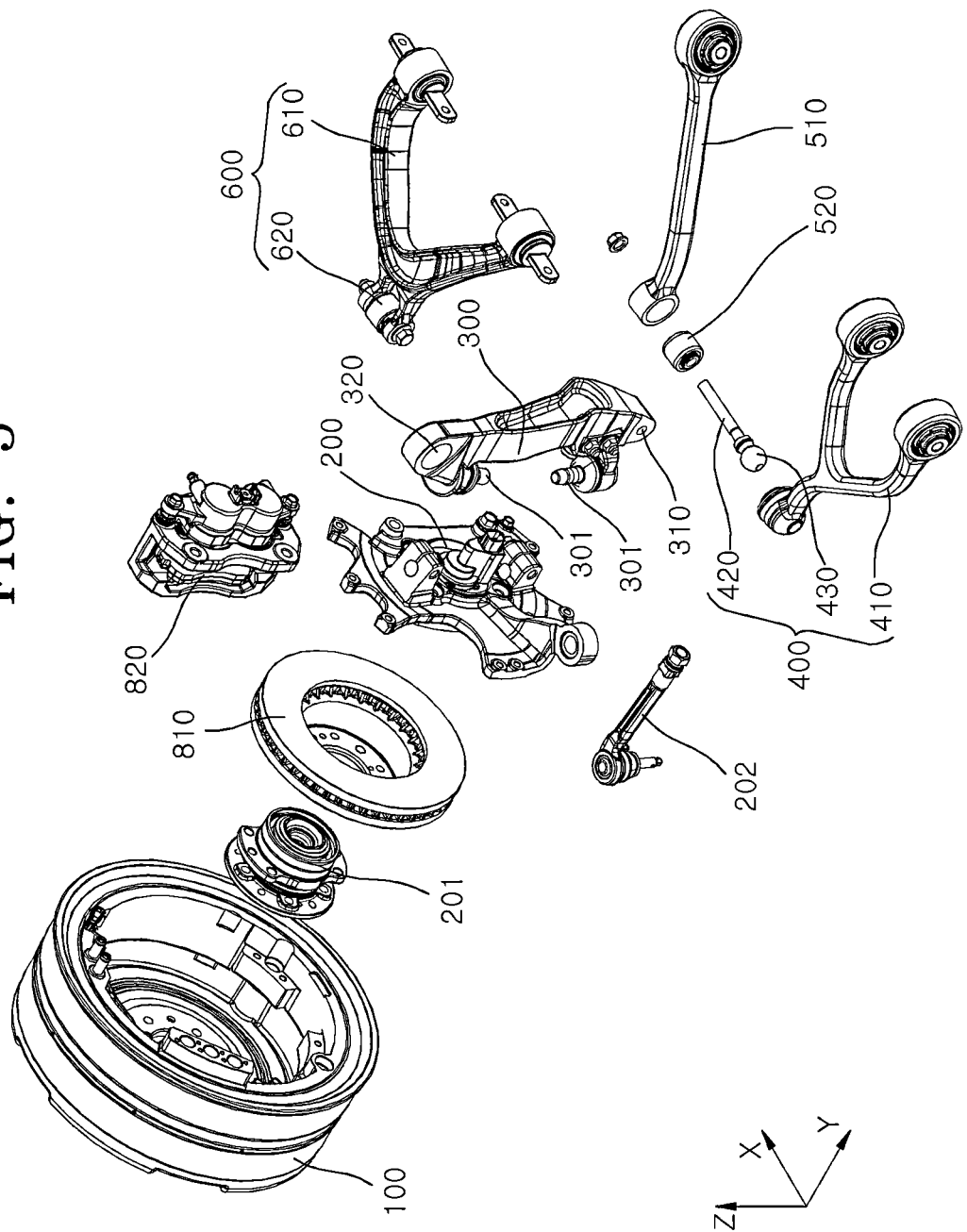
FIG. 5 is an exploded perspective view schematically illustrating the configuration of the suspension apparatus in accordance with an embodiment of the present disclosure.

FIG. 1 is a view schematically illustrating an installation state of a suspension apparatus in accordance with an embodiment of the present disclosure, FIG. 2 is a perspective view schematically illustrating the configuration of the suspension apparatus in accordance with an embodiment of the present disclosure, FIG. 3 is a side view schematically illustrating the configuration of the suspension apparatus in accordance with an embodiment of the present disclosure, FIG. 4 is a front view schematically illustrating the configuration of the suspension apparatus in accordance with an embodiment of the present disclosure, and FIG. 5 is an exploded perspective view schematically illustrating the configuration of the suspension apparatus in accordance with an embodiment of the present disclosure.

Referring to FIGS. 1 to 5, a plurality of suspension apparatuses 1 may be provided. The plurality of suspension apparatuses 1 may be individually installed on respective wheels 2.

One suspension apparatus 1 among the plurality of suspension apparatuses 1 is described below as an example. The description of one suspension apparatus 1 to be described below may be equally applied to the remaining suspension apparatuses 1.

A vehicle body V is a component that forms the exterior and framework of a vehicle and may include a main body, a chassis frame, and a subframe.

The following is an example in which, based on FIGS. 1 to 5, a longitudinal direction of the vehicle body V refers to a direction parallel to an X-axis direction, a width direction of the vehicle body V refers to a direction parallel to a Y-axis direction, and a direction perpendicular to the ground refers to a direction parallel to a Z-axis direction.

The suspension apparatus 1 in accordance with the present embodiment includes a drive unit 100, a first knuckle 200, a second knuckle 300, a first suspension arm 400, and a limiting member 500.

The drive unit 100 may serve as a component that rotates the wheel 2 by providing a driving force to the wheel 2 when the vehicle is running. The drive unit 100 may be installed inside the wheel 2 of the vehicle.

The drive unit 100 in accordance with the present embodiment may be disposed inside the wheel 2, and exemplified as various types of in-wheel motors including a stator that forms a magnetic field by receiving power from a vehicle's battery or the like and a rotor that is rotated by electromagnetic interaction between the stator and the rotor and rotates the wheel 2. The stator and the rotor have their central axes coaxial with a central axis C of the wheel 2, and may be stacked concentrically on the inside of the wheel 2.

The first knuckle 200 may be connected to the drive unit 100 to rotate around a first axis A1, and may change a steering angle of the wheel 2. The first knuckle 200 may serve as a component that supports the drive unit 100 disposed inside the wheel 2 and transmits a steering force to the wheel 2.

The first knuckle 200 in accordance with the present embodiment may be disposed between the drive unit 100 and the vehicle body V. The first knuckle 200 may be disposed to face the drive unit 100 along a direction parallel to the central axis C of the wheel 2. The first knuckle 200 may be connected to the stator of the drive unit 100 by various types of coupling methods such as bolting and welding. The first knuckle 200 may rotatably support the rotor of the drive unit 100 via a wheel bearing 201. The first knuckle 200 may be manufactured by molding a metal-based material using a casting or the like in order to ensure sufficient rigidity.

The first knuckle 200 may be rotatably supported around the first axis A1 by the second knuckle 300 to be described below. The first knuckle 200 may be connected to a tie rod 202, and may receive a steering force generated by a driver's steering wheel operation through the tie rod 202. The first knuckle 200 may rotate clockwise or counterclockwise around the first axis A1 by the received steering force, and change the steering angle of the wheel 2.

The first axis A1 may serve as a steering axis of the wheel 2. As illustrated in FIG. 3, the first axis A1 may be inclinedly disposed with respect to a third axis A3 extending perpendicular to the ground and the width direction of the vehicle body V to form a predetermined kingpin angle. Accordingly, the first knuckle 200 may reduce a steering force required for steering the wheel 2 and reduce an impact applied to the vehicle during braking.

As illustrated in FIG. 4, the first axis A1 may be inclinedly disposed with respect to the third axis A3 and the longitudinal direction of the vehicle body V to form a predetermined caster angle. For example, the first axis A1 may be disposed to be inclined at an angle of about 9.1° from the third axis A3 toward the direction (X-axis in FIG. 4) parallel to the longitudinal direction of the vehicle body V. Accordingly, the first knuckle 200 may improve straight driving performance of the vehicle and provide a restoring force to the wheel 2 after cornering.

The specific shape of the first knuckle 200 is not limited to the shape illustrated in FIG. 5, and the first knuckle 200 can be designed in various ways within the technical idea of a shape that may be connected to the drive unit 100 and rotated around the first axis A1.

The second knuckle 300 may be connected to the first knuckle 200 to rotatably support the first knuckle 200 around the first axis A1. The second knuckle 300 may move along a second axis A2 spaced apart from the first axis A1 during a bump and rebound motion of the wheel 2. That is, the second knuckle 300 may serve as a component that provides a support force to the first knuckle 200 and guides the direction of suspension behavior of the wheel 2.

The second knuckle 300 in accordance with the present embodiment may be disposed between the first knuckle 200 and the vehicle body V. The second knuckle 300 may be disposed to face the first knuckle 200 along a direction parallel to the central axis C of the wheel 2. That is, the drive unit 100, the first knuckle 200, and the second knuckle 300 may be sequentially disposed from the wheel 2 toward the vehicle body V.

A longitudinal direction of the second knuckle 300 may be disposed in parallel to the second axis A2. Both upper and lower ends of the second knuckle 300 may be disposed to be spaced apart from each other along the second axis A2. The second knuckle 300 may rectilinearly reciprocate up and down along the second axis A2 during the bump and rebound behavior of the wheel 2.

The second axis A2 may serve as a suspension axis of the wheel 2. As illustrated in FIG. 3, the first axis A1 and the second axis A2 may be spaced apart from each other along the width direction of the vehicle body V. That is, the first knuckle 200 and the second knuckle 300 may separate the steering axis of the wheel 2 and the suspension axis of the wheel 2 from each other. A distance between the second axis A2 and the wheel 2 may be greater than a distance between the first axis A1 and the wheel 2. Accordingly, the first axis A1 serving as the steering axis of the wheel 2 is disposed at a position relatively close to the wheel 2, so that the first knuckle 200 and the second knuckle 300 may reduce a kingpin offset value and improve the driving and braking stability of the vehicle.

As illustrated in FIG. 4, the second axis A2 may be inclinedly disposed with respect to the third axis A3 and the longitudinal direction of the vehicle body V to form a predetermined caster angle. For example, the second axis A2 may be disposed to be inclined at an angle of about 9.1° from the third axis A3 toward a direction (X-axis in FIG. 4) parallel to the longitudinal direction of the vehicle body V.

The second knuckle 300 may include a knuckle joint 301 that rotatably supports the first knuckle 200. The knuckle joint 301 may include various types of connection means that may connect different parts, such as ball joints, to be relatively rotatable. The knuckle joint 301 may be provided as a pair. The pair of knuckle joints 301 may be disposed to be spaced apart from each other along the first axis A1. The pair of knuckle joints 301 may be individually connected to different positions of the first knuckle 200 spaced apart from the second knuckle 300 along the first axis A1.

The second knuckle 300 may further include a first connection part 310 and a second connection part 320. The first connection part 310 and the second connection part 320 may be respectively disposed at both ends of the second knuckle 300 spaced apart from each other along the second axis A2. The first connection part 310 and the second connection part 320 may each be formed to have a shape of a hole penetrating the second knuckle 300. The central axes of the first connection part 310 and the second connection part 320 may be disposed perpendicular to the second axis A2 and the central axis C of the wheel 2. The following is an example in which the first connection part 310 is located below the second connection part 320; however, the first connection part 310 and the second connection part 320 are not limited thereto and the first connection part 310 may be located above the second connection part 320.

The specific shape of the second knuckle 300 is not limited to the shape illustrated in FIG. 5, and the second knuckle 300 can be designed in various ways within the technical idea of a shape that supports the first axis A1 so that the first knuckle 200 can be rotated and can reciprocate along the second axis A2 during the bump and rebound motion of the wheel 2.

The first suspension arm 400 may be connected to the second knuckle 300 to support the second knuckle 300 with respect to the vehicle body V. The following description is an example in which the first suspension arm 400 is connected to the first connection part 310 of the second knuckle 300; however, the first suspension arm 400 is not limited thereto and may be connected to the second connection part 320 of the second knuckle 300.

Figure 6:
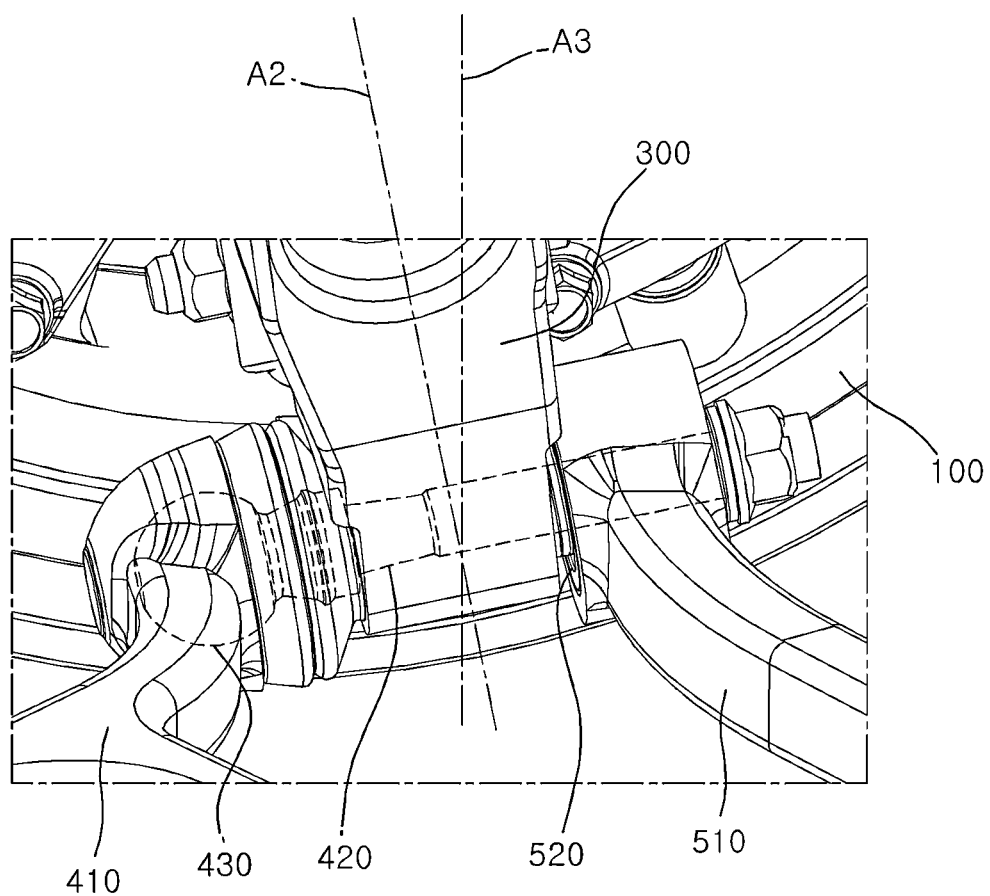
FIG. 6 is an enlarged view schematically illustrating the configuration of a first suspension arm and a limiting member in accordance with an embodiment of the present disclosure.
Figure 7:
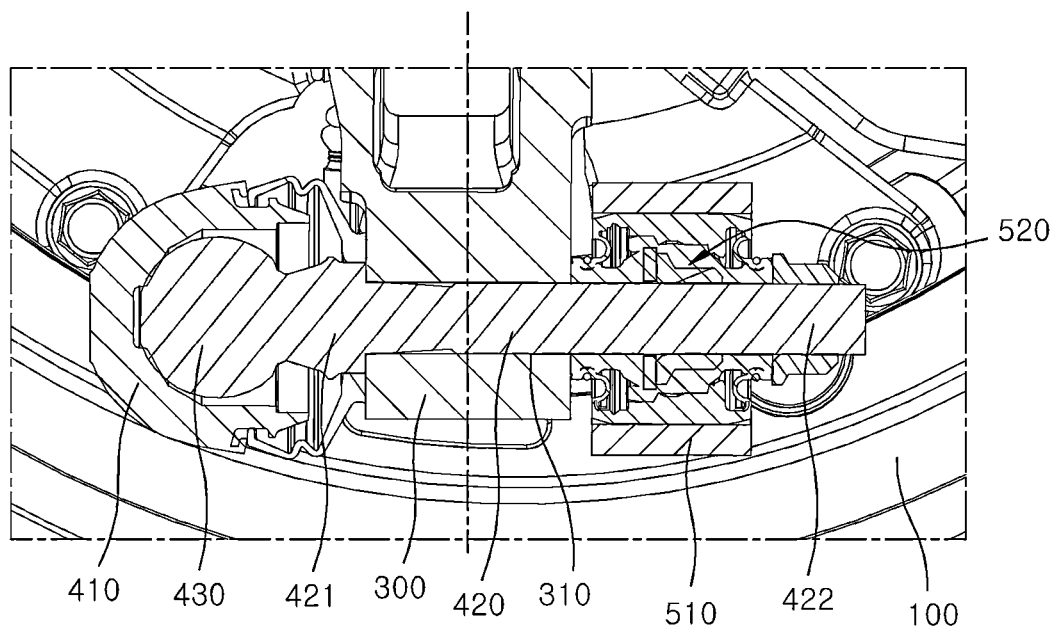
FIG. 7 is a cross-sectional view schematically illustrating the configuration of the first suspension arm and the limiting member in accordance with an embodiment of the present disclosure.
Figure 8:
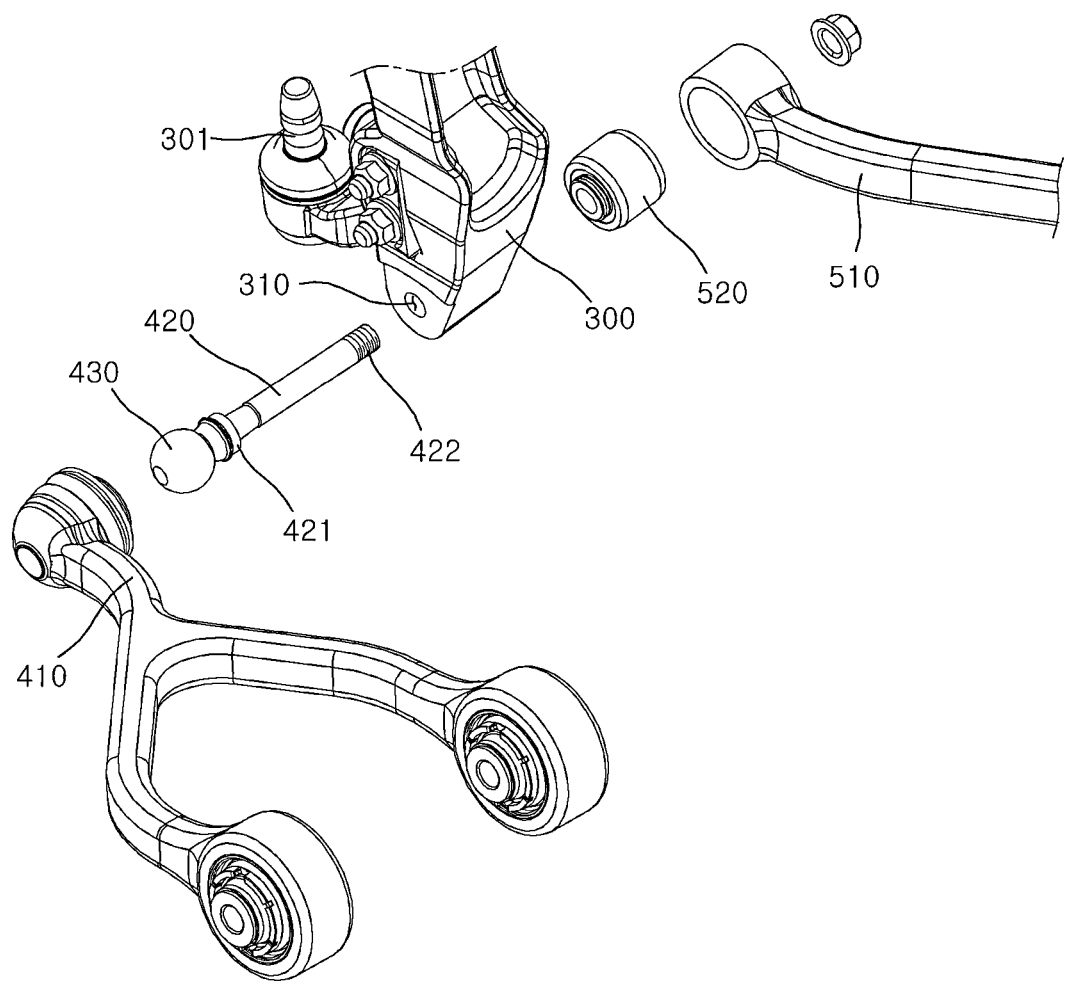
FIG. 8 is an exploded perspective view schematically illustrating the configuration of the first suspension arm and the limiting member in accordance with an embodiment of the present disclosure.

FIG. 6 is an enlarged view schematically illustrating the configuration of the first suspension arm and the limiting member in accordance with an embodiment of the present disclosure, FIG. 7 is a cross-sectional view schematically illustrating the configuration of the first suspension arm and the limiting member in accordance with an embodiment of the present disclosure, and FIG. 8 is an exploded perspective view schematically illustrating the configuration of the first suspension arm and the limiting member in accordance with an embodiment of the present disclosure.

Referring to FIGS. 1 to 8, the first suspension arm 400 in accordance with the present embodiment may include a first arm body 410, a joint body 420, and a first joint 430.

The first arm body 410 may form a schematic external appearance of the first suspension arm 400, and extend from the vehicle body V toward the second knuckle 300.

The first arm body 410 in accordance with the present embodiment may be formed to have a wishbone shape. However, the shape of the first arm body 410 is not limited thereto, and the first arm body 410 can be designed in various shapes such as a link arm. The first arm body 410 may be disposed between the second knuckle 300 and the vehicle body V.

One end of the first arm body 410 may be rotatably connected to the vehicle body V via a bush, bearing, joint, or the like. One end of the first arm body 410 may rotate clockwise or counterclockwise around a direction parallel to the longitudinal direction of the vehicle body V during the bump and rebound motion of the wheel 2.

The other end of the first arm body 410 may be disposed to face one side of the first connection part 310 of the second knuckle 300. The other end of the first arm body 410 may be spaced apart from the first connection part 310 along the central axis of the first connection part 310.

The joint body 420 may be connected to the second knuckle 300. The joint body 420 in accordance with the present embodiment may be formed to have a bar shape having a first end 421 and a second end 422. The joint body 420 may be disposed so that its central axis is coaxial with the central axis of the first connection part 310. The joint body 420 may be inserted into the first connection part 310. An outer surface of the joint body 420 may be fixed to an inner surface of the first connection part 310. Accordingly, the joint body 420 may not rotate around the central axis of the first connection part 310.

The first end 421 and the second end 422 may protrude to both sides of the second knuckle 300 with respect to the first connection part 310. As the central axis of the joint body 420 is located on the same axis as the central axis of the first connection part 310, the first end 421 and the second end 422 may be spaced apart from each other along a direction intersecting the second axis A2, more specifically, a direction perpendicular to the second axis A2. The first end 421 may be disposed to face the other end of the first arm body 410 facing one side of the first connection part 310.

The first joint 430 may be connected to the first end 421 to rotatably support the first arm body 410 with respect to the joint body 420. The first joint 430 in accordance with the present embodiment may extend from the first end 421 toward the other end of the first arm body 410. The first joint 430 may be inserted into the other end of the first arm body 410.

The first joint 430 may be formed to have a spherical shape. An outer surface of the first joint 430 may be in rolling contact with the inner surface of the other end of the first arm body 410. Accordingly, the first joint 430 may be rotated in multiple axes with respect to the first arm body 410 during the suspension behavior of the wheel 2, and may absorb relative displacement between the second knuckle 300 and the first arm body 410 by a caster angle of the second axis A2.

The limiting member 500 may be connected to the first suspension arm 400 to limit the rotation of the second knuckle 300 around the second axis A2. More specifically, the limiting member 500 may serve as a configuration of limiting the rotation of the second knuckle 300 around the second axis A2 by a rotational force applied from the first knuckle 200 when the first knuckle 200 rotates around the first axis A1. Accordingly, the limiting member 500 may prevent the second knuckle 300 from rotating together with the first knuckle 200 when steering the wheel 2, prevent a kingpin offset from arbitrarily increasing, and improve the driving stability of the vehicle.

Both sides of the limiting member 500 may be connected to the vehicle body V and the second end 422 of the joint body 420, respectively. Accordingly, the first arm body 410 and the limiting member 500 may connect, to the vehicle body V, the first end 421 and the second end 422 of the joint body 420 spaced apart from each other in the direction intersecting the second axis A2, thereby suppressing the rotation of the second knuckle 300 around the second axis A2.

The limiting member 500 may include a limiting link 510 and a limiting joint 520.

The limiting link 510 may be spaced apart from the first arm body 410 and may extend from the vehicle body V toward the second knuckle 300.

The limiting link 510 in accordance with the present embodiment may be formed to have the shape of a link arm. However, the shape of the limiting link 510 is not limited thereto, and the limiting link 510 can be designed in various shapes such as a wishbone. The limiting link 510 may be disposed between the second knuckle 300 and the vehicle body V.

One end of the limiting link 510 may be rotatably connected to the vehicle body V via a bush, a bearing, a joint, or the like. One end of the limiting link 510 may rotate clockwise or counterclockwise around a direction parallel to the longitudinal direction of the vehicle body V during the bump and rebound motion of the wheel 2.

The other end of the limiting link 510 may be spaced apart from the first connection part 310 along the central axis of the first connection part 310. That is, the other end of the first arm body 410 and the other end of the limiting link 510 may be disposed on both sides of the second knuckle 300 with the first connection part 310 interposed therebetween. The other end of the limiting link 510 may be disposed to face the second end 422 of the joint body 420 protruding from the other side of the first connection part 310 of the second knuckle 300.

The limiting joint 520 may be connected to the second end 422 of the joint body 420 to rotatably support the limiting link 510 with respect to the second end 422.

Figure 9:
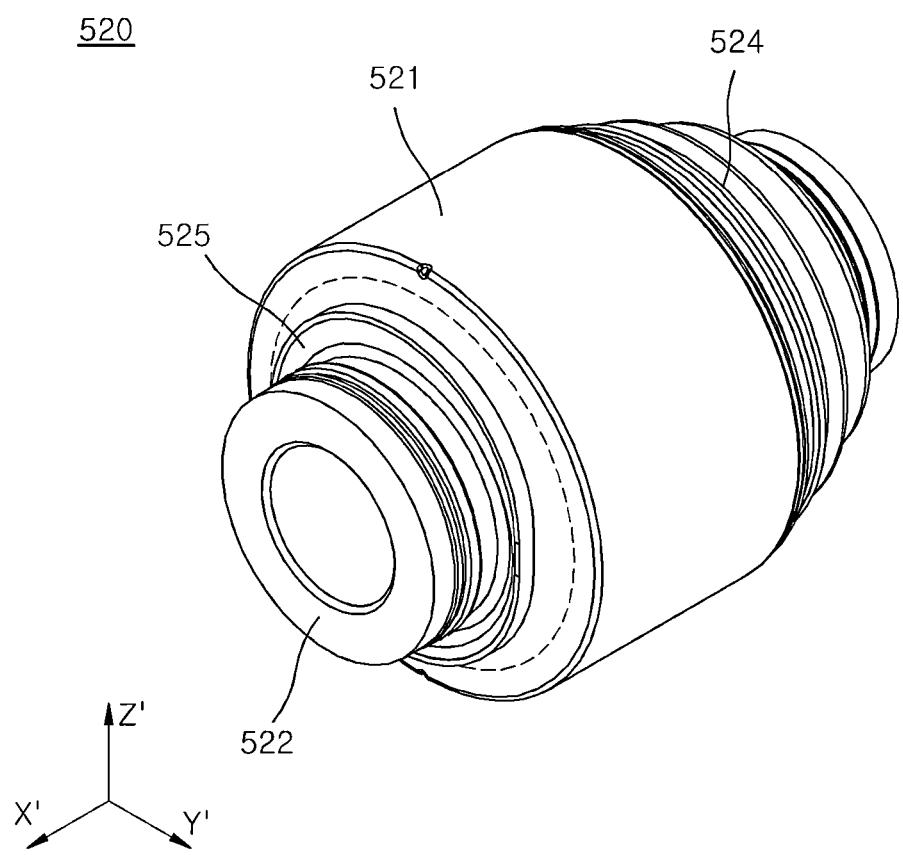
FIG. 9 is a perspective view schematically illustrating the configuration of a limiting joint in accordance with an embodiment of the present disclosure.
Figure 10:
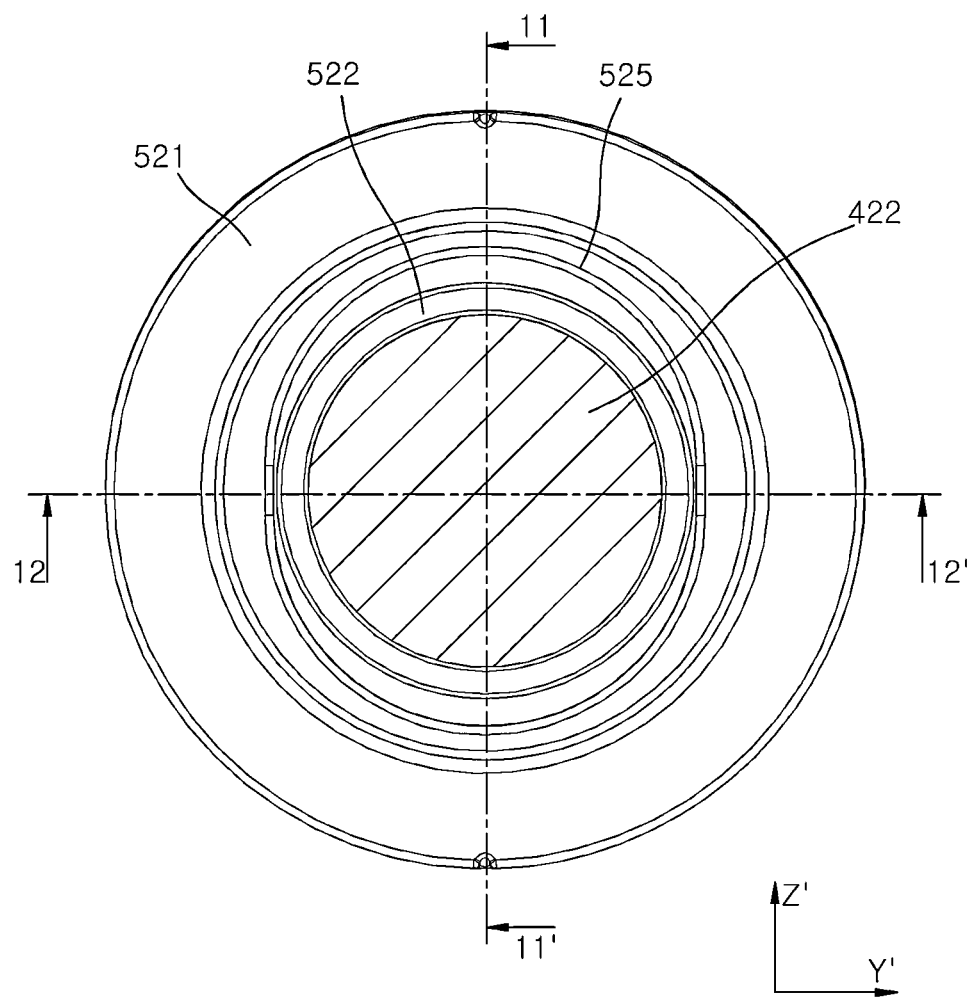
FIG. 10 is a front view schematically illustrating the configuration of the limiting joint in accordance with an embodiment of the present disclosure.
Figure 11:
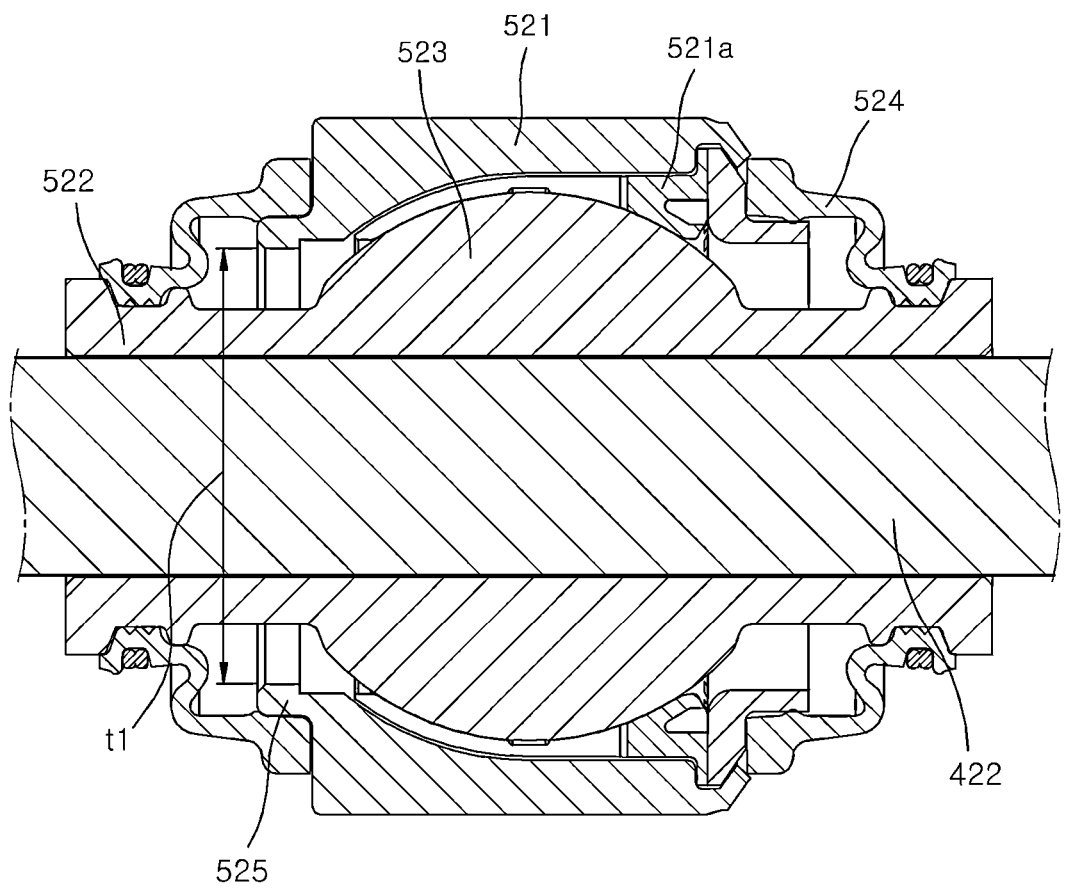
FIG. 11 is a cross-sectional view taken along line 11-11' in FIG. 10.
Figure 12:
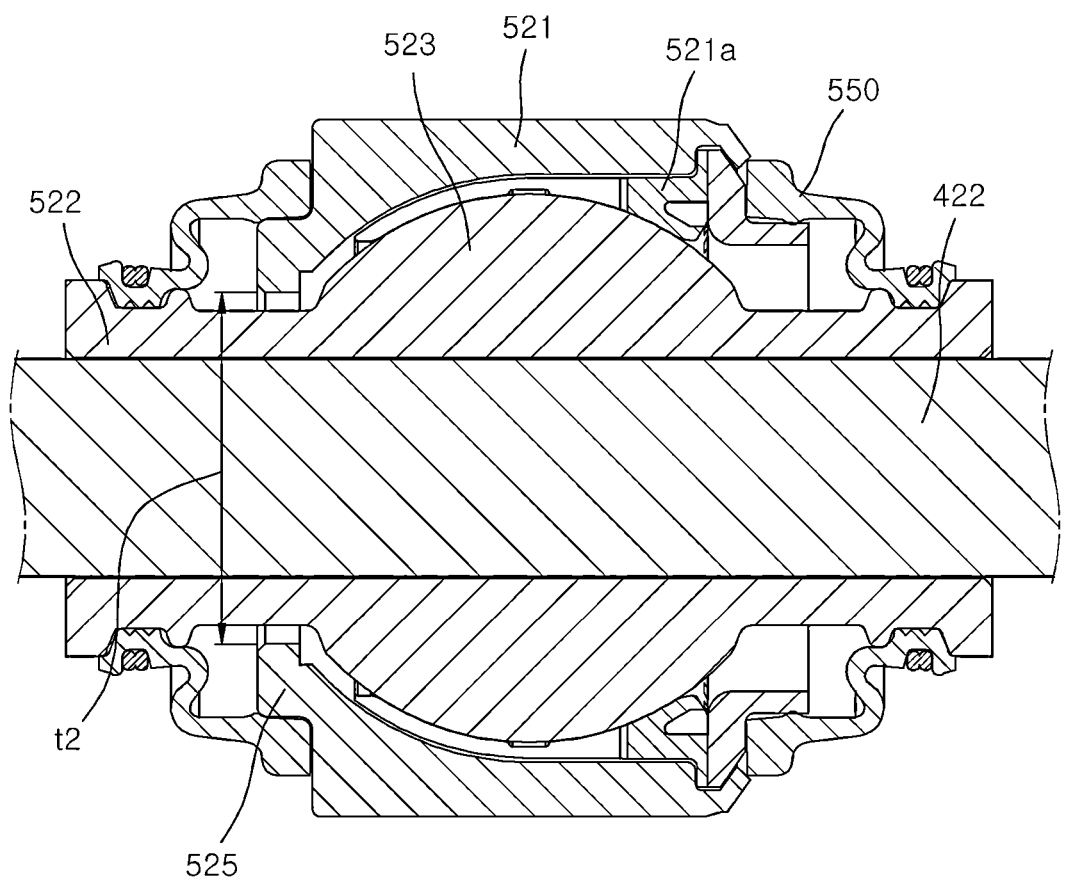
FIG. 12 is a cross-sectional view taken along line 12-12' in FIG. 10.

FIG. 9 is a perspective view schematically illustrating the configuration of the limiting joint in accordance with an embodiment of the present disclosure, FIG. 10 is a front view schematically illustrating the configuration of the limiting joint in accordance with an embodiment of the present disclosure, FIG. 11 is a cross-sectional view taken along line 11-11' in FIG. 10, and FIG. 12 is a cross-sectional view taken along line 12-12' in FIG. 10.

A Z' axis illustrated in FIGS. 9 to 12 refers to an axis parallel to the second axis A2 illustrated in FIGS. 1 to 4, and a Y' axis may refer to an axis parallel to the Y axis illustrated in FIGS. 1 to 4.

Referring to FIGS. 1 to 12, the limiting joint 520 in accordance with the present embodiment may include an outer body 521, an inner body 522, and a stud 523.

The outer body 521 may form a schematic external appearance of the limiting joint 520 and may be connected to the limiting link 510. The outer body 521 in accordance with the present embodiment may be formed to have a cylindrical shape with openings at both ends thereof. The outer body 521 may be inserted into and fixed to the other end of the limiting link 510. An outer peripheral surface of the outer body 521 may be press-fitted to the inner peripheral surface of the other end of the limiting link 510 or may be fixed thereto by welding. An inner peripheral surface of the outer body 521 may be disposed to surround an entire peripheral surface of the second end 422. The inner peripheral surface of the outer body 521 may be spaced apart from an outer peripheral surface of the second end 422 by a predetermined distance.

The outer body 521 may include a bearing portion 521a for rotatably supporting a stud 523 to be described below. The bearing portion 521a may be manufactured separately from the outer body 521 and then coupled to the outer body 521. Alternatively, the bearing portion 521a may be formed integrally with the outer body 521. The bearing portion 521a may be formed to protrude from the inner peripheral surface of the outer body 521 toward the second end 422 by a predetermined distance.

The inner body 522 may be disposed inside the outer body 521 and connected to the second end 422. The inner body 522 in accordance with the present embodiment may be formed to have a hollow rod shape. The second end 422 may be inserted into the inner body 522 through the hollow of the inner body 522. An inner peripheral surface of the inner body 522 may be fixed to the outer peripheral surface of the second end 422 by press fitting, welding, or the like. A central axis of the inner body 522 may be disposed to be coaxial with a central axis of the joint body 420. The central axis of the inner body 522 may be disposed perpendicular to the second axis A2.

The stud 523 may be connected to the inner body 522 and may be rotatably in contact with the outer body 521. The stud 523 in accordance with the present embodiment may protrude from an outer peripheral surface of the inner body 522 toward the inner peripheral surface of the outer body 521. An outer surface of the stud 523 may be rotatably in contact with the bearing portion 521a of the outer body 521.

The stud 523 may be formed to have a spherical shape. The outer surface of the stud 523 may be in rolling contact with an inner surface of the bearing portion 521a. Accordingly, the stud 523 may be rotated in multiple axes with respect to the outer body 521 during the suspension behavior of the wheel 2, and may absorb relative displacement between the second knuckle 300 and the first arm body 410 by the caster angle of the second axis A2. In this case, as the rotational motion of the second knuckle 300 around the second axis A2 is suppressed by the length rigidity of the first arm body 410 and the limiting link 510, the rotation of the first joint 430 and the stud 523 around a direction parallel to the second axis A2 may also be selectively suppressed.

The limiting joint 520 may further include a dust cover 524.

The dust cover 524 may serve as a component for blocking foreign substances from entering the interior of the outer body 521. The dust cover 524 in accordance with the present embodiment may be formed to have a hollow corrugated tube shape with both sides open. The dust cover 524 may be disposed to surround the end of the inner body 522. Both sides of the dust cover 524 may be fixed to the outer peripheral surface of the outer body 521 and the outer peripheral surface of the inner body 522, respectively. The dust cover 524 may be made of an elastically deformable material such as rubber or silicone so as not to interfere with relative rotation between the outer body 521 and the inner body 522.

The dust cover 524 may be provided as a pair. The pair of dust covers 524 may be symmetrically disposed on both sides of the outer body 521.

The limiting joint 520 may further include a stopper 525.

The stopper 525 may be disposed to surround the inner body 522 and may restrict the stud 523 from rotating about a direction parallel to the second axis A2. The stopper 525 may serve as a component that additionally suppresses the rotational motion of the second knuckle 300 about the second axis A2 in addition to the length rigidity of the first arm body 410 and the limiting link 510.

The stopper 525 in accordance with the present embodiment may extend from the end of the outer body 521 along the longitudinal direction of the inner body 522. The stopper 525 may be formed to have a hollow ring shape with both sides open. An inner surface of the stopper 525 may be disposed to surround the entire outer peripheral surface of the inner body 522.

The stopper 525 may be formed to have a substantially oval cross-sectional shape. For example, as illustrated in FIGS. 10 to 12, a width t1 of the stopper 525 parallel to the second axis A2 may be greater than a width t2 of the stopper 525 intersecting the second axis A2, more specifically, perpendicular to the second axis A2. The width of the stopper 525 may refer to a distance between the inner surfaces of the stopper 525 perpendicular to the longitudinal direction of the joint body 420 and passing through the central axis of the joint body 420. Accordingly, the stopper 525 may suppress the rotation of the second knuckle 300 about the second axis A2 by reducing the range in which the stud 523 can rotate about the direction parallel to the second axis A2.

The width t2 of the stopper 525 perpendicular to the second axis A2 may be equal to an outer diameter of the inner body 522. Accordingly, the stopper 525 may maintain a state in contact with the outer peripheral surface of the inner body 522 in a direction perpendicular to the second axis A2, thereby more effectively suppressing the rotation of the second knuckle 300 about the second axis A2.

The suspension apparatus in accordance with the present embodiment may further include a second suspension arm 600.

The second suspension arm 600 may be spaced apart from the first suspension arm 400 and connected to the second knuckle 300. The second suspension arm 600 may serve as a configuration of supporting the second knuckle 300 with respect to the vehicle body V at a different position from the first suspension arm 400. The following is an example in which the second suspension arm 600 is connected to the second connection part 320 of the second knuckle 300; however, the second suspension arm 600 is not limited thereto and can also be connected to the first connection part 310 of the second knuckle 300.

The second suspension arm 600 in accordance with the present embodiment may include a second arm body 610 and a second joint 620.

The second arm body 610 may form a schematic external appearance of the second suspension arm 600 and may extend from the vehicle body V toward the second knuckle 300.

The second arm body 610 in accordance with the present embodiment may be formed to have a wishbone shape. However, the shape of the second arm body 610 is not limited thereto, and the second arm body 610 can be designed in various shapes such as a link arm. The second arm body 610 may be disposed between the second knuckle 300 and the vehicle body V. The second arm body 610 may be disposed to be spaced apart from the first arm body 410 along the second axis A2.

One end of the second arm body 610 may be rotatably connected to the vehicle body V via a bush, bearing, joint, or the like. One end of the second arm body 610 may rotate clockwise or counterclockwise around a direction parallel to the longitudinal direction of the vehicle body V during the bump and rebound motion of the wheel 2. The other end of the second arm body 610 may be disposed to face the second connection part 320 of the second knuckle 300.

The second joint 620 may be connected to the second knuckle 300 to rotatably support the second arm body 610 with respect to the second knuckle 300. The second joint 620 in accordance with the present embodiment may be inserted into the second connection part 320. Both sides of the second joint 620 may protrude from the second connection part 320 to both sides of the second knuckle 300, respectively. Both sides of the second joint 620 may be connected to different positions of the other end of the second arm body 610 facing the second connection part 320, respectively.

The second joint 620 may include a connection means, such as a ball joint, that can support the second arm body 610 to be rotatable in multiple axes with respect to the second knuckle 300. Accordingly, the second arm body 610 may be rotated in multiple axes with respect to the second knuckle 300 during the suspension behavior of the wheel 2, and may absorb relative displacement between the second knuckle 300 and the second arm body 610 by the caster angle of the second axis A2.

The suspension apparatus in accordance with the present embodiment may further include a shock absorber 700. For example, the shock absorber 700 may be a combination of a shock absorber and a coil spring (e.g., a McPherson strut) or include other types of suspension systems known in the art.

The shock absorber 700 may absorb shock or vibration transmitted from a road surface to the vehicle body through the wheel 2.

The shock absorber 700 in accordance with the present embodiment may be exemplified with various types of shock absorbers including a cylinder that is expandable in the longitudinal direction and a spring that elastically supports the expansion and contraction motion of the cylinder. The shock absorber 700 may be disposed in parallel to the second axis A2 in the longitudinal direction. One end of the shock absorber 700 may be connected to the first arm body 410, and the other end thereof may be connected to a wheel housing (not illustrated) of the vehicle.

The suspension apparatus in accordance with the present embodiment may further include a braking unit 800.

The braking unit 800 may apply or release a braking force by interfering with the rotation of the wheel 2.

The braking unit 800 in accordance with the present embodiment may include a brake disk 810 and a caliper brake 820.

The brake disc 810 may be connected to the wheel 2 or the drive unit 100 to rotate in conjunction with the rotation of the wheel 2. The brake disc 810 in accordance with the present embodiment may be formed to have a disk shape and installed inside the wheel 2. The brake disc 810 may be disposed so that its central axis is located on the same line as the central axis of the wheel 2. The brake disc 810 may be integrally connected to the wheel 2 or the rotor of the drive unit 100 by bolting or the like. Accordingly, the brake disc 810 may rotate about the central axis together with the wheel 2 when the wheel 2 rotates. A diameter of the brake disc 810 can be designed in various ways depending on the diameter of the wheel 2, the size of the drive unit 100, and the like.

The caliper brake 820 may apply a braking force by pressing the brake disc 810 when braking the vehicle. The caliper brake 820 in accordance with the present embodiment may include a brake pad disposed to face the brake disc 810, a caliper housing coupled to the first knuckle 200 to support the brake pad to enable reciprocating movement, and a piston that is installed in the caliper housing to be able to move forward and backward and presses the brake pad toward the brake disc 810 depending on the direction of movement or releases the pressure on the brake pad.

An operation of the suspension apparatus in accordance with an embodiment of the present invention is described below in detail.

Figure 13:
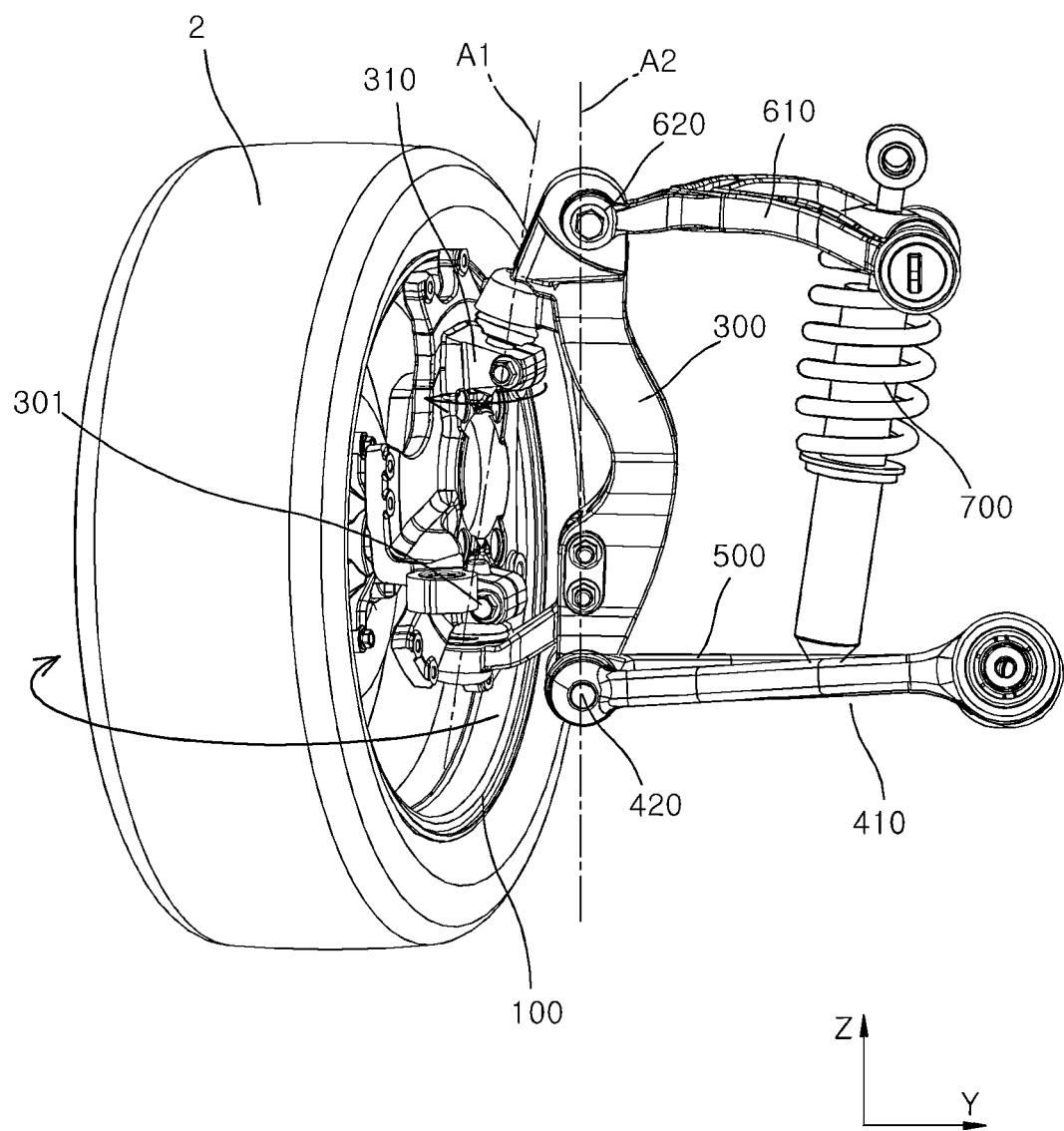
FIG. 13 is an operation view schematically illustrating an operation of adjusting a steering angle of a wheel.

FIG. 13 is an operation view schematically illustrating the operation of adjusting the steering angle of the wheel.

Referring to FIGS. 1 to 13, when steering the vehicle, a steering force generated by a driver's steering wheel operation is transmitted to the first knuckle 200 through the tie rod 202.

The first knuckle 200 rotates clockwise or counterclockwise about the first axis A1 and changes the steering angle of the wheel 2.

As the first knuckle 200 rotates around the first axis A1, a rotational force is generated in the second knuckle 300 around the second axis A2.

The rotational force of the second knuckle 300 is transmitted to the joint body 420 through the first connection part 310, and the first end 421 and the second end 422 of the joint body 420 apply a tensile force or a compressive force to the first arm body 410 and the limiting link 510, respectively.

The tensile force or compressive force applied to the first arm body 410 and the limiting link 510 is offset by the rigidity of the first arm body 410 and the limiting link 510, and the rotation of the second knuckle 300 around the second axis A2 can be suppressed.

In this process, the rotation of the second knuckle 300 around the second axis A2 may be suppressed multiple times by a reaction force generated as the inner body 522 of the limiting joint 520 contacts the stopper 525 in the direction perpendicular to the second axis A2.

Figure 14:
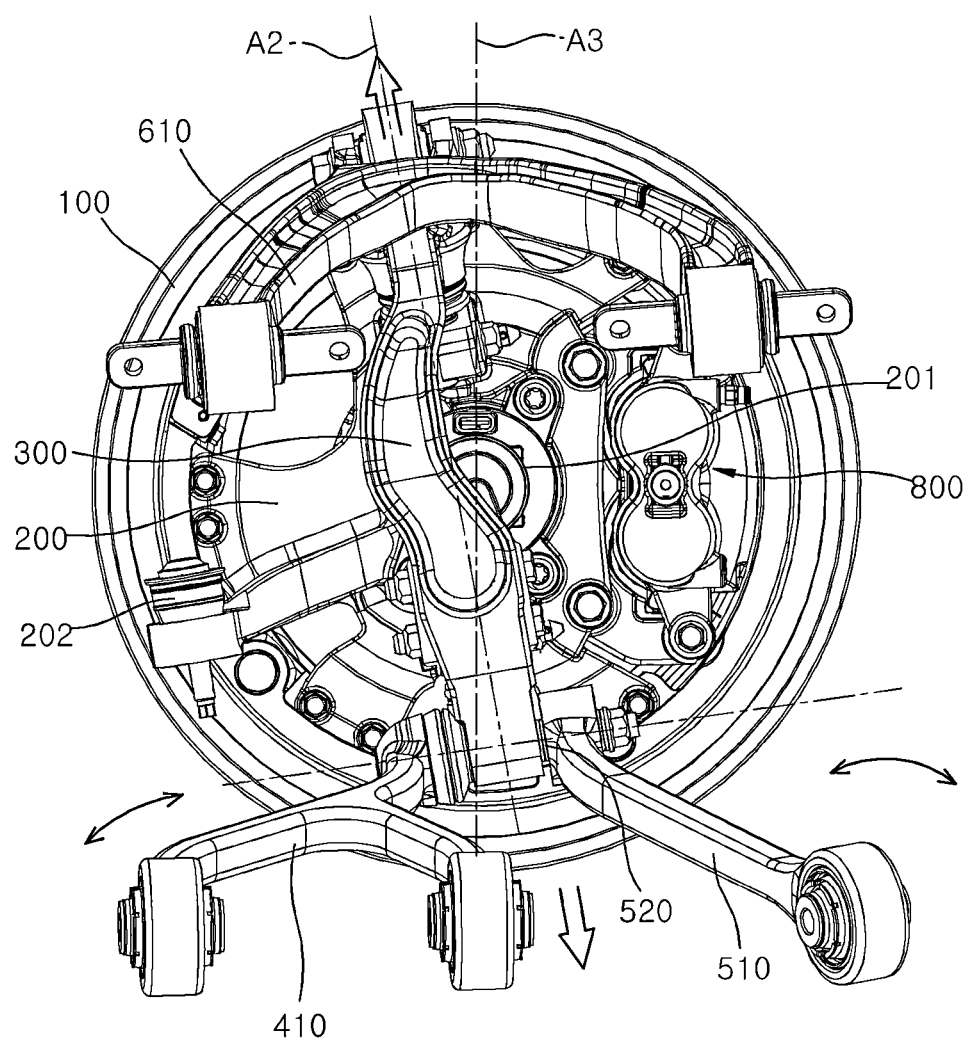
FIG. 14 is an operation view schematically illustrating a bump and rebound operation of the wheel.

FIG. 14 is an operation view schematically illustrating the bump and rebound operation of the wheel.

Referring to FIG. 14, when the wheel 2 bumps and rebounds due to unevenness of a road surface or the like, the second knuckle 300 connected to the wheel 2 through the first knuckle 200 is rectilinearly reciprocated along the second axis A2 together with the wheel 2.

One end of the first arm body 410 and one end of the limiting link 510 are rotated relative to the vehicle body V by the reciprocating movement of the second knuckle 300.

The second axis A2 is disposed to be inclined at a predetermined angle from the third axis A3 in the longitudinal direction of the vehicle body V, and as the rotational central axis of one end of the first arm body 410 and the rotational central axis of one end of the limiting link 510 are disposed in parallel with the longitudinal direction of the vehicle body V, a torsional load is generated between the other ends of the first arm body 410 and the limiting link 510 and the second knuckle 300.

The first joint 430 and the limiting joint 520 rotate the first arm body 410 and the limiting link 510 relative to the second knuckle 300, respectively.

Through the angular displacement of the first arm body 410 and the limiting link 510 with respect to the second knuckle 300 described above, the torsional load generated between the other ends of the first arm body 410 and the limiting link 510 and the second knuckle 300 can be canceled out.

The suspension apparatus may be capable of countering an increase in torque steer due to an increase in a kingpin offset (due to an increase in the weight of the wheel), in response to at least one of the driving force being applied, the braking force being applied, or a combination thereof. This type of suspension may be used where there is an increase in the weight of the wheels of the vehicle, e.g., in an electric vehicle (EV) with wheels including one or more in-wheel motors.

Although the present disclosure has been described with reference to the embodiments illustrated in the drawings, the embodiments of the disclosure are for illustrative purposes only, and those skilled in the art will appreciate that various modifications and other equivalent embodiments are possible from the embodiments. Thus, the true technical scope of the present disclosure should be defined by the following claims.

What is claimed is:

1. A suspension apparatus comprising:
    a drive unit installed inside a wheel;
    a first knuckle connected to the drive unit and configured to rotate around a first axis;
    a second knuckle connected to the first knuckle and configured to move along a second axis spaced apart from the first axis;
    a first suspension arm connected to the second knuckle and configured to support the second knuckle with respect to a vehicle body, wherein the first suspension arm comprises a first arm body configured to extend from the vehicle body toward the second knuckle, a joint body connected to the second knuckle and comprising a first end and a second end, and a first joint connected to the first end and configured to rotatably support the first arm body; and
    a limiting member connected to the first suspension arm and configured to limit rotation of the second knuckle around the second axis.

2. The suspension apparatus according to claim 1, wherein a distance between the second axis and the wheel is greater than a distance between the first axis and the wheel.

3. The suspension apparatus according to claim 1, wherein the drive unit, the first knuckle, and the second knuckle are sequentially disposed from the wheel toward the vehicle body.

4. The suspension apparatus according to claim 1,
    wherein the first end of the joint body protrudes at one side of the second knuckle, and
    wherein the second end of the joint body protrudes at another side of the second knuckle.

5. The suspension apparatus according to claim 1, wherein the first end and the second end are spaced apart from each other in a direction intersecting the second axis.

6. The suspension apparatus according to claim 1,
    wherein the second axis is inclined with respect to a third axis extending vertically from a ground and a longitudinal direction of the vehicle body, and
    wherein the first joint has a spherical shape.

7. The suspension apparatus according to claim 1, wherein both sides of the limiting member are respectively connected to the vehicle body and the second end.

8. The suspension apparatus according to claim 7, wherein the limiting member comprises:
    a limiting link spaced apart from the first arm body and configured to extend from the vehicle body toward the second knuckle; and
    a limiting joint connected to the second end and configured to rotatably support the limiting link with respect to the second end.

9. The suspension apparatus according to claim 8, wherein the limiting joint comprises:
    an outer body connected to the limiting link;
    an inner body disposed inside the outer body and connected to the second end; and
    a stud connected to the inner body and configured to rotatably contact with the outer body.

10. The suspension apparatus according to claim 9,
    wherein the second axis is inclined with respect to a third axis extending vertically from a ground and a longitudinal direction of the vehicle body, and
    wherein the stud has a spherical shape.

11. The suspension apparatus according to claim 9, wherein the limiting joint further comprises:
    a stopper disposed to surround the inner body and configured to restrict the stud from rotating about a direction parallel to the second axis.

12. The suspension apparatus according to claim 11, wherein a width of the stopper parallel to the second axis is greater than a width of the stopper intersecting the second axis.

13. The suspension apparatus according to claim 1, further comprising:
    a second suspension arm spaced apart from the first suspension arm and connected to the second knuckle.

14. The suspension apparatus according to claim 13,
    wherein the second knuckle comprises a first connection part and a second connection part spaced apart from each other along the second axis, and
    wherein the first suspension arm and the second suspension arm are respectively connected to the first connection part and the second connection part.

15. A suspension apparatus for a vehicle, the apparatus comprising:
    a drive unit installed inside a wheel and configured to provide a driving force to rotate the wheel;
    a brake unit configured to provide a braking force to the wheel;

a first knuckle connected to the drive unit and configured to rotate around a first axis;

a second knuckle connected to the first knuckle and configured to move along a second axis spaced apart from the first axis;

a first suspension arm connected to the second knuckle and configured to support the second knuckle with respect to a vehicle body, wherein the first suspension arm comprises a first arm body configured to extend from the vehicle body toward the second knuckle, a joint body connected to the second knuckle and comprising a first end and a second end, and a first joint connected to the first end and configured to rotatably support the first arm body; and a limiting member connected to the first suspension arm and configured to limit rotation of the second knuckle around the second axis.

16. The apparatus according to claim 15, wherein the drive unit includes a motor.

17. The apparatus according to claim 15, wherein the first knuckle, the second knuckle, the first suspension arm and the limiting member are configured to counter an increase in torque steer due to an increase in a kingpin offset, in response to at least one of the driving force being applied by the drive unit, the braking force being applied by the brake unit, or a combination thereof.

18. The apparatus according to claim 15,
wherein a distance between the second axis and the wheel is greater than a distance between the first axis and the wheel, and
wherein the drive unit, the first knuckle, and the second knuckle are sequentially disposed from the wheel toward the vehicle body.

* * * * *